United States Patent [19]

Sparber

[11] 4,197,429

[45] Apr. 8, 1980

[54] GAIN-ADJUSTING CONFERENCE CIRCUIT

[75] Inventor: Richard G. Sparber, Wheaton, Ill.

[73] Assignee: Bell Telephone Laboratories, Incorporated, Murray Hill, N.J.

[21] Appl. No.: 925,190

[22] Filed: Jul. 17, 1978

[51] Int. Cl.² .............................................. H04M 3/56
[52] U.S. Cl. ................................................ 179/18 BC
[58] Field of Search ........................ 179/18 BC, 1 CN

[56] References Cited

U.S. PATENT DOCUMENTS 3,050,584    8/1962    Miller ............................... 171/1 CN

*Primary Examiner*—Thomas W. Brown
*Attorney, Agent, or Firm*—Peter Visserman

[57] ABSTRACT

A conference circuit (150) is disclosed for use in a telephone switching system (100) to provide communication among three or more subscriber stations (101, 102, 103). The subscriber stations (101, 102, 103) are connected to a plurality of ports (P0, P1, P2) of the conference circuit via communication lines (104, 105, 106) and a switching network (130). Amplification circuitry (210, 211, 212) connected to the ports (P0, P1, P2) provides input signal amplification to assure adequate transmission quality. A sensing circuit (220, 221) detects signals generated by subscriber station transitions and generates timed control signals to adjust the magnitude of amplification of input signals from the subscriber stations (101, 102, 103) for a predetermined period of time. Circuits (S1, S2) which supervise the states of junctor circuits (121, 122) connected to the conference circuit (150) provide for further gain control of the amplification circuitry (210, 211, 212). Power is supplied to the conference circuit from a junctor circuit (120) associated with one of the subscriber station connections.

15 Claims, 3 Drawing Figures

GAIN-ADJUSTING CONFERENCE CIRCUIT

TECHNICAL FIELD

This invention relates to telephone switching systems and, more particularly, to conference circuits employed in telephone switching systems for establishing communication among three or more subscriber stations.

BACKGROUND OF THE INVENTION

Modern telephone switching systems are capable of providing a feature known as "conference calling" which allows a plurality of telephone subscribers to be joined in a conversation. Customarily, a conference circuit is employed to interconnect all subscribers of a conference call. To assure adequate transmission quality, the conference circuit incorporates signal amplification circuits which offset the effective transmission line losses occurring when several communication lines are interconnected. Furthermore, a mechanism must be provided to adjust the gain of the amplification device when lines are added to or disconnected from the conference circuit, since the effective transmission characteristics vary with the number of lines connected to the conference circuit.

Several schemes exist in the prior art which utilize conference circuits to provide multiple subscriber connections and which include signal amplification devices. One prior circuit disclosed in U.S. Pat. No. 3,423,538, W. B. Gaunt, utilizes a series of cascaded amplifiers arranged in a closed loop. One or more telephone communication lines is coupled to each amplifier and signals from each line are transmitted through the amplifier loop to all other lines. The Gaunt patent discloses several circuit embodiments each of which utilizes an arrangement comprising a plurality of amplifiers and negative impedance networks for maintaining adequate signal transmission quality. However, such an arrangement is uneconomical since it has high power consumption and necessitates extensive power circuitry. A further limitation of the arrangement is that it requires extensive external system control to assure that circuit oscillations do not occur when a subscriber line connected to the conference connection goes from an off-hook to an on-hook state.

A further prior art disclosure is U.S. Pat. No. 3,441,678, A. H. Budlong et al., involving a conference circuit arrangement having a plurality of individual conference circuits connected to a transformer-amplifier arrangement for coupling the circuits together. The Budlong arrangement requires extensive transformer and relay circuitry. Further, relay and supervisory functions require dedicated communication paths between a remote system control circuit and the individual conference circuits.

SUMMARY OF THE INVENTION

Advantageously, a technical advance is achieved in a telephone communication system comprising a multiport conference circuit arrangement whereby gain control is provided during a conference call without the necessity of extensive line supervisory circuitry or dedicated communication path circuitry between the conference circuit and system control elements of the telephone system. The arrangement of the invention further allows circuit design simplicity and cost reduction by utilizing power supplied by junctor circuits associated with established communication line connections to the conference circuit.

The conference circuit arrangement comprises a plurality of ports for establishing conferencing connections to communication lines connected to a plurality of subscriber stations. The conference circuit further comprises amplifier circuitry connected to the ports for amplifying input signals from the communication lines. Sensing circuitry is connected to the ports and the amplifier circuitry for sensing transition signals generated by subscriber station transitions for applying a control signal to the amplifier circuitry. The amplifier circuitry is directly responsive to the control signal for adjusting the magnitude of amplification of the input signals.

In accordance with the invention, the sensing circuitry comprises level sensing means and timing means. The level sensing means is responsive to subscriber station transition signals for generating a timer initialization signal. The timing means is responsive to the timer initialization signal for applying the control signal to the amplifier circuitry for a predetermined period of time.

The telephone communication system further comprises multistate junctor circuits interconnecting the communication lines and the plurality of conference circuit ports. The plurality of ports comprises a controlling port and first and second noncontrolling ports. Power is supplied to the conference circuit via the junctor circuit associated with the controlling port. First and second supervisory elements are connected to the amplifier circuitry and to the first and second noncontrolling ports, respectively. The supervisory elements are responsive to junctor circuit state changes for applying first and second junctor state control signals to the amplifier circuitry. The amplifier circuitry is responsive to either of the junctor state control signals for adjusting the magnitude of amplification of the input signals.

The conference circuit further comprises direct current blocking means and frequency compensation means connected to the plurality of ports and to the amplifier circuitry. The direct current blocking means prohibits direct current input signals from being applied to the amplifier circuitry. The frequency compensation means is responsive to input signals from the communication lines to apply to the amplification circuitry input signals having predetermined frequencies and to prohibit application of input signals of other frequencies.

The amplifier circuitry comprises an amplifier, an amplification control means, and a voltage controlled current source means. The amplifier is responsive to input signals from the communication lines and to the amplification control means to generate amplified signals. The amplification control means is responsive to the control signal from the timing means and to the first and second junctor state control signals for adjusting the magnitude of the amplified signals. The voltage controlled current source is connected to the plurality of ports and generates a current which is a function of the magnitude and frequency of the amplified signals.

A method for achieving the advantages of the invention includes the steps of connecting a plurality of ports to a plurality of communication lines having subscriber stations connected thereto. A level sensing means generates a timer initialization signal when a transition signal is detected from a communication line. A timing means then generates a control signal which is applied to an amplification circuit for a predetermined period of time. The amplification circuit then adjusts the magnitude of amplification of input signals from the communication lines for the predetermined period of time.

BRIEF DESCRIPTION OF THE DRAWING

The invention may be understood from the following detailed description when read with reference to the drawing in which.

DETAILED DESCRIPTION

Figure 1:
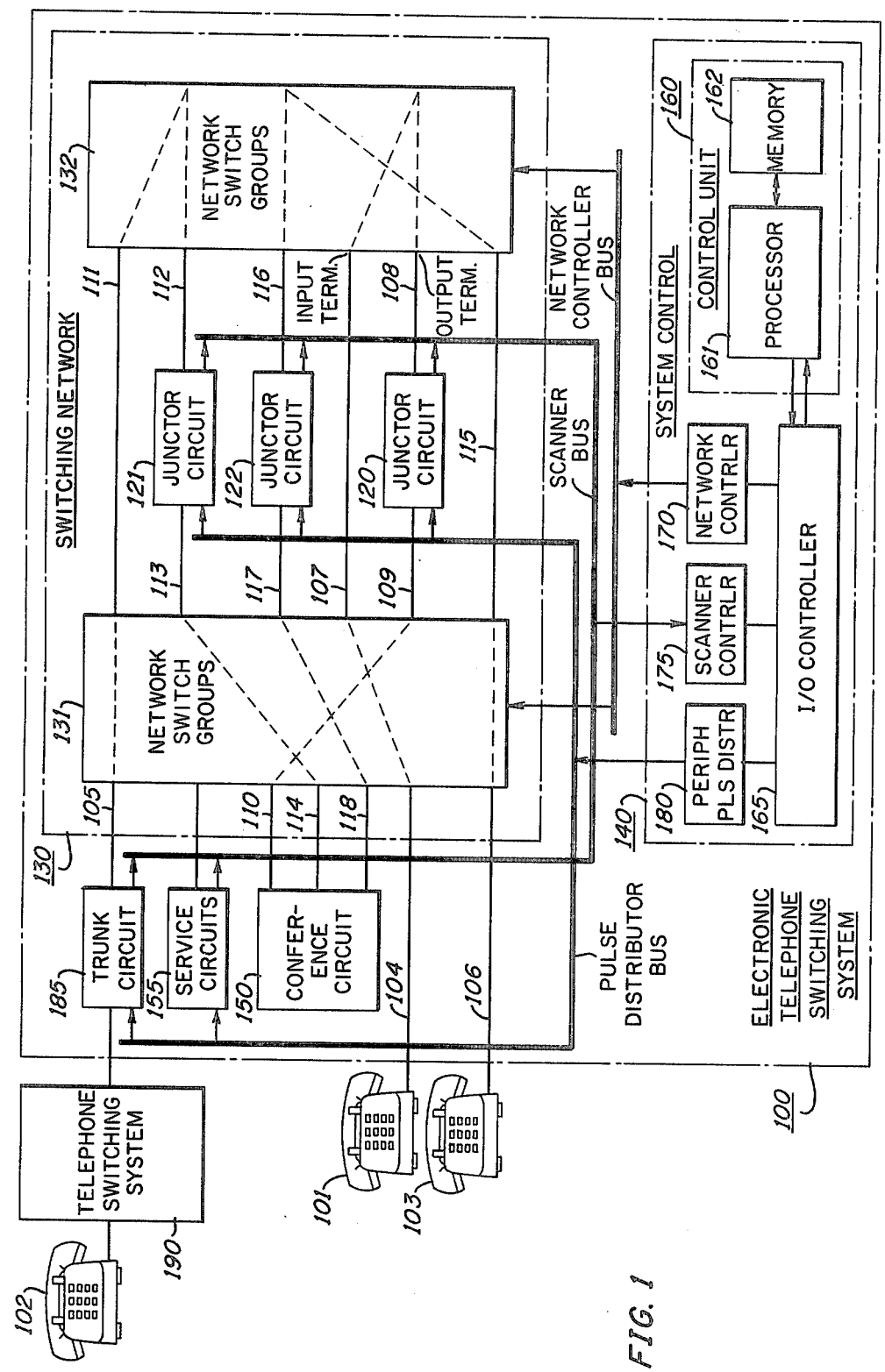
FIG. 1 is a block diagram of one illustrative embodiment of a telephone communication system comprising a conference circuit in accordance with the invention.

The principles of this invention are disclosed, by way of example, in an electronic program controlled telephone system of the design shown in FIG. 1. Systems of the general type as shown in FIG. 1 are described in articles entitled "No. 1 Electronic Switching System", *The Bell System Technical Journal*, Vol. 43, No. 5, September, 1964, and "No. 2 ESS", *The Bell System Technical Journal*, Vol. 48, No. 8, October, 1969. The illustrative electronic telephone switching system 100 described herein, comprises a switching network 130, a switching system control 140, a trunk circuit 185, service circuits 155, a conference circuit 150 and the appropriate interconnections.

The electronic telephone switching system 100 of FIG. 1 is designed to serve a plurality of telephone subscriber stations, such as the subscriber stations shown as 101, 102, and 103. Subscriber stations 101 and 103 are assumed to be originating subscribers of the telephone system 100. Subscriber station 102 is assumed to be an originating subscriber of a separate telephone switching system 190, which may be interconnected to subscriber stations of switching system 100 via the trunk circuit 185, and switching network 130. Utilizing subscriber station 101 as an example of one of the plurality of subscriber stations, station 101 is individually connected to switching network 130 of the telephone switching system 100 via communication line 104. The switching network 130 comprises the network switch 131, the network switch 132, and junctor circuits 120, 121, and 122 connected between the switch 131 and the switch 132. Network switches 131 and 132 may be any known telephone network switches such as disclosed, for example, in the aforementioned articles published in *The Bell System Technical Journal*. Communication line 104 is terminated on the network switch 131, which comprises switching facilities for establishing communication paths between subscriber stations and various circuits associated with the switching system. In the illustrative embodiment shown in FIG. 1, a selected number of the terminating linkages from switch 131 are distributed to input terminals of switch 132. By way of example, line 107 shown in FIG. 1 represents a connection from switch 131 to an input terminal of switch 132. Switch 132 comprises input terminals connected directly to linkages from switch 131 and output terminals connected through junctor circuits to the remainder of the terminating linkages of switch 131. By way of example, line 108 is a connection from an output terminal of switch 132 to junctor circuit 120, while line 109 is a connection from junctor circuit 120 to a terminating linkage of switch 131. The junctor circuits 120 through 122 are identical circuits and are electrically located between switch 131 and switch 132 and provide supervision of communication lines in both directions during an "intraoffice" (i.e., a call between two subscriber stations terminating in the same switching system) call and supervision towards the intraoffice communication line during outgoing and incoming calls. Connections may be further established between the network switch 131 and trunk circuit 185, service circuits 155, and conference circuit 150 as shown in FIG. 1. Service circuits 155 comprise circuits such as customer dial pulse receivers, ringing control circuits, and audible ringing tone circuits, all of which are well known in the art. The switching network 131 may further comprise supervisory elements, such as the well-known line ferrod elements, to provide for initial detection of subscriber station transitions, i.e., "on-hook" to "off-hook" transitions. Thus, switching network 130 is a facility for selectively establishing communication path utilizing network switches 131 and 132 and junctor circuits 120 through 122 between subscriber stations 101 through 103, trunk circuit 185, service circuits 155, and conference circuit 150.

In the illustrative embodiment shown in FIG. 1, the system control 140 comprises a control unit 160, an input/output controller 165, a network controller 170, a scanner controller 175, a peripheral pulse distributor 180, and connections for establishing data communication between the aforementioned elements and other circuitry of switching system 100. Control unit 160 comprises a processor 161 and a memory 162 for control and execution of stored program instructions to perform various functions relating to operations of the telephone switching system 100. The system control 140 as shown in FIG. 1 is well known in the prior art. A similar telephone system control arrangement is described in the aforementioned published article entitled "No. 2 ESS."

Communications between circuit elements of the system control 140, switching network 130, trunk circuit 185 and service circuits 155 of the switching system 100 are by way of bus systems such as the pulse distributor, scanner, and network controller buses depicted in FIG. 1. The scanner controller 175 associated with input/output controller 165 permits, via signals received on the scanner bus, the processor 161 to monitor the status of circuits such as trunk circuit 185 and junctor circuits 120 through 122 of the telephone switching system 100. Signals received on the scanner bus are representative of supervisory information, such as the on-hook and off-hook status of customer lines, and results of the monitoring of specific test points within switching network 130. The peripheral pulse distributor 180 associated with input/output controller 165 is utilized to send control signals to various circuitry within the telephone switching system 100. The network controller 170, in association with the input/output controller 165, is utilized to send various interconnection command signals to each of network switches 131 and 132.

Conference circuit 150 as depicted in FIG. 1 is utilized to interconnect, via switching network 130, the communication lines of subscriber stations associated with a conference call. The basic purpose of a conference circuit in a telephone switching system is to minimize the transmission effects of adding at least a third subscriber to a two-subscriber connection. Specifically, two transmission parameters are degraded when three or more communication lines are interconnected. These parameters are insertion loss and return loss. Insertion loss, as applied to a conference circuit, is a measure of the reduced signal strength at a subscriber station as a third communication line is bridged across an existing two-subscriber connection. As is well known in the pertinent art, if it is assumed that three subscribers have identical transmission characteristics on their associated communication lines, the signal strength will drop by half, or three dB, with the addition of the third subscriber connection.

Return loss is a measure of what amount of a signal generated by a subscriber station and transmitted to another subscriber is returned to the originator. From a transmission circuit design viewpoint, return loss is a measure of how well the transmission impedance characteristics of a communication line is matched with its associated load impedance. In the ideal situation, a perfect match of the impedance of an originating line to its load impedance will result in no energy being reflected back into the line from the load, and therefore an infinite return loss. An imperfect match will result in reflected energy appearing as an echo signal to an originating subscriber station. A strong echo signal is produced if the impedance mismatch is substantial. Such an echo signal is extremely annoying if time delays are substantial and the signal is above the general noise level associated with the communication line. Further, if the echo signal is passed through any type of amplification, the echo signal strength may actually be greater than that of the original signal. Under such conditions, the signals appearing on the communication line may appear in oscillation as the returning echo signal again reflects along the originating line. Such an oscillation results in a loud tone at the subscriber station. A more detailed discussion of the concepts of return loss and insertion loss in transmission lines and communication circuits may be found in *Signals, Systems, and Communications*, B. Lathi, Wiley, 1965.

The utilization of a conference circuit for effecting transmission loss characteristics during a conference call can best be described by a brief discussion of the connection of a third subscriber to an existing two-subscriber connection. Assume that subscriber "A" is the originating subscriber of a telephone call and has the conference service. Initially, subscriber "A" is connected to subscriber "B" and the transmission characteristics of the communication lines associated with subscribers "A" and "B" are substantially equal. With the matching impedance characteristics of the communication lines, the return loss is substantially infinite and no echo signals appear on the communication lines. However, when a subscriber "C", having a communication line with characteristics substantially equal to those of "A" and "B", is then added to the existing connection, the load impedance as seen by each subscriber is now half of that seen in the existing two-subscriber connection. The result is a poor impedance match between each communication line and its load impedance, thereby causing signal strength loss and echo signals to appear on all transmission lines with substantial degradation of transmission quality. A conference circuit is utilized to modify the apparent load impedance characteristics of the communication lines connected thereto such that each line has a properly matched load impedance. For example, if each of the communication lines associated with subscribers "A", "B", and "C" has an impedance of Z, the function of the conference circuit is to provide an effective parallel impedance of $-Z$. The load impedance as seen by each of the communication lines is then a parallel combination of $-Z$, Z, and Z, resulting in an effective load impedance of Z. The conference circuit therefore, provides a negative shunt impedance of $-Z$ when there is a three-subscriber conference connection.

A known method of effecting a negative shunt impedance in a conference circuit is to utilize an inverting amplification circuit. The conference circuit therefore provides both conferencing interconnection of communication lines and gain for signals occurring on the communication lines. However, a problem arises in that whenever gain is present in a circuit, the possibility exists of spontaneous oscillations. To insure against such a possibility, it is necessary to keep losses associated with the interconnected communication lines equal to or greater than the amount of gain provided by the conference circuit. If a communication line is removed from the conference connection, it is necessary to either reduce the gain or increase the losses associated with the subsequent existing connection. Failure to maintain such a balance between the gain and the losses may result in oscillation and strong tone signals emanating from the conference circuit.

In accordance with the invention as shown in the illustrative embodiment of FIG. 1, a conference call between three subscriber stations 101, 102, and 103 is shown by means of dotted lines in switches 131 and 132, as it exists in a stable connection. Subscriber station 101 is connected to system 100 and is assumed to be the subscriber station which initiated the conference call. It is connected to the network switch 131 via communication line 104. A linkage of network switch 131 connects line 104 to an input terminal of switch 132 via line 107. A connection is completed to junctor circuit 120 via line 108. Junctor circuit 120 is connected to network switch 131 via line 109 which is then connected to conference circuit 150 via line 110. Subscriber station 102 is assumed to be a second subscriber associated with the conference call and further, by way of example, is shown to be a subscriber station terminating on a telephone switching system 190 separate from system 100. Subscriber station 102 is connected to the telephone switching system 100 via trunk circuit 185 and communication line 105. In a similar manner as that utilized with subscriber station 101 and line 104, communication line 105 is connected to conference circuit 150 via lines 111 and 112, junctor circuit 121, and lines 113 and 114. Subscriber station 103 is a third subscriber associated with the conference call and is connected to switching system 100 via communication line 106. A communication path is established between line 106 and conference circuit 150 via lines 115 and 116, junctor circuit 122, and lines 117 and 118.

Figure 2:
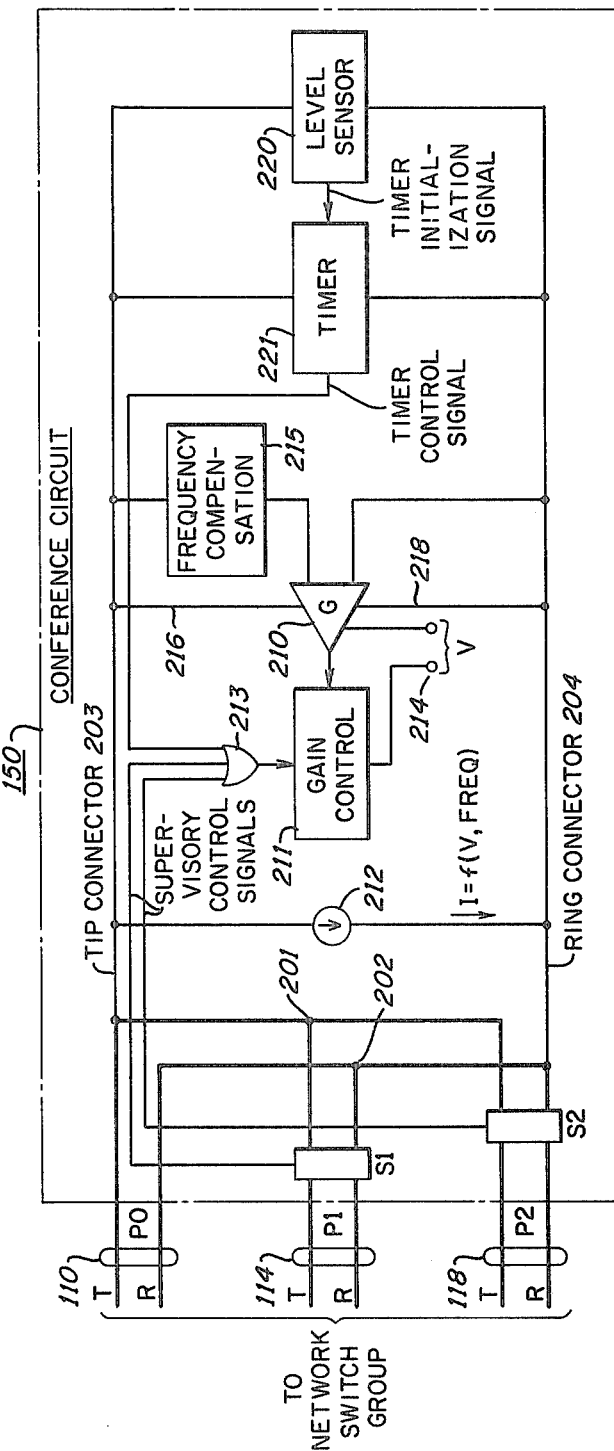
FIG. 2 is a block diagram of one illustrative embodiment of a conference circuit in accordance with the invention.
Figure 3:
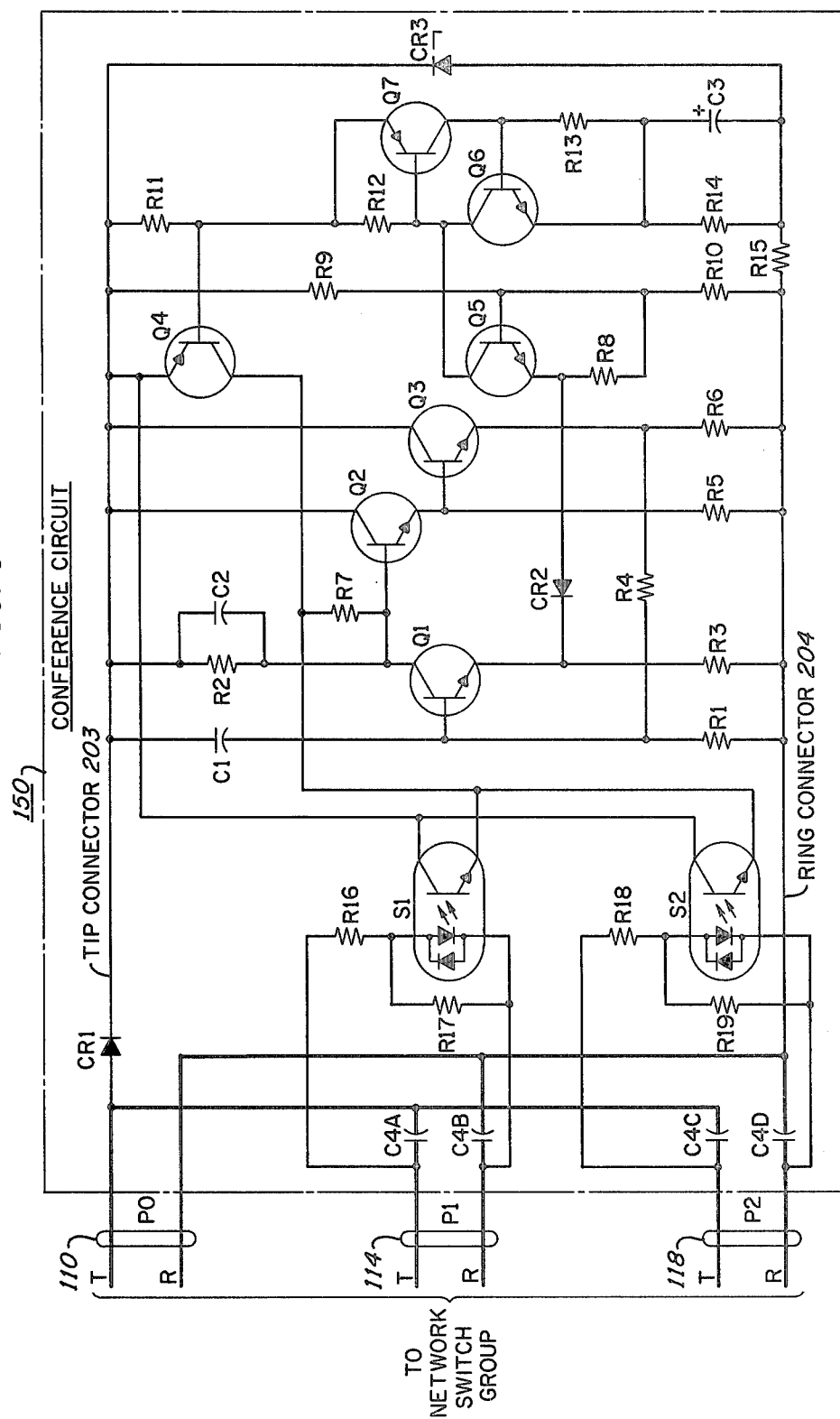
FIG. 3 is a detailed schematic diagram of the conference circuit of FIG. 2 in accordance with the invention.

A functional block diagram of the illustrative embodiment of conference circuit 150 according to the invention, is depicted in FIG. 2. FIG. 3 shows a more detailed circuit diagram for implementing the functions of the conference circuit 150. Conference circuit 150 comprises three ports, P0 through P2. Each port P0 through P2 comprises a pair of terminals, designated as a "tip" or "T" terminal and a "ring" or "R" terminal. Each of ports P0 through P2 is connectable to linkages of network switch 131 in switching network 130 as shown in FIG. 1. By way of the example of the stable conference connection depicted in FIG. 1 and discussed in preceding paragraphs, ports P0 through P2 are connected to lines 110, 114, and 118, respectively (each of lines 110, 114, and 118 comprising a pair of connectable paths). Therefore, subscriber station 101, previously designated as the controlling subscriber, is associated with port P0, and port P0 is termed the "controlling port." This designation is utilized since the subscriber station 101 associated with port P0 is assumed to have initiated the conference call. Ports P1 and P2 are associated with subscriber stations 102 and 103, respectively, and are designated as "noncontrolling ports."

Conference circuit 150 as depicted in FIG. 2 has no independent power supply or direct communication to the system control 140 shown in FIG. 1. Power is supplied to conference circuit 150 from junctor circuit 120 connected to port P0 through network switch 131 as shown in FIG. 1. Junctor circuits 120 through 122 are identical and have a plurality of "states" associated with each of their external connections. Such junctor circuits are well known in the art and are described in the previously referenced Bell System Technical Journal articles. Utilizing terminology common in the pertinent art, when junctor circuit 120 is placed in the "line" state facing conference circuit 150, power is established to the conference circuit. Transition to the "trunk" state in the direction of conference circuit 150 removes power from the conference circuit. Further, each of junctor circuits 120 through 122 has supervisory circuitry and direct communication with the system control 140 depicted in FIG. 1 for monitoring the status of subscriber stations connected thereto.

A function of conference circuit 150 is to provide amplification and gain control to effect a variable negative shunt impedance during a three-subscriber conference call when each of the subscriber stations 101 through 103 associated with the conference call is connected to one of ports P0 through P2 through the network connections previously described with respect to FIG. 1. The negative shunt impedance is provided via amplifier circuit 210, gain control circuit 211, and voltage controlled current source 212 as shown in FIG. 2.

The tip and ring terminals of ports P0 through P2 which are connected to junctor circuits 120 through 122 are connected together at connectors 203 and 204, respectively, as shown in FIG. 2, which will hereafter be designated the tip connector 203 and the ring connector 204, respectively. Power is supplied to amplifier 210 from the tip and ring connectors 203 and 204 of conference circuit 150 via connectors 216 and 218. Amplifier 210 generates amplified signals corresponding to input signals occurring on connectors 203 and 204. Gain control circuit 211 is responsive to output signals generated by amplifier circuit 210 and symbolic OR gate 213. Input signals to OR gate 213 comprise the output signals of timer circuit 221 and supervisory circuit elements S1 and S2 which will be discussed in subsequent paragraphs. For purpose of description, the output signal of gate 213 will be said to be in the "low" state when it is applied to gain control circuit 211 such that the signal has no effect on the gain of conference circuit 150. Further, when any of the input signals to gate 213 is in a "high" state, the output signal of gate 213 will also be in the "high" state and the gain control circuit 211 will be responsive to the output signal, thereby reducing the amplification of circuit 210. The resultant amplified signal of amplifier 210 and gain control circuitry 211 is designated symbolically in FIG. 2 as signal "V" at terminal pair 214.

The active circuitry of conference circuit 150 providing the negative shunt impedance further comprises the voltage controlled current source 212 shown in FIG. 2 in symbolic notation. Current source 212 is a standard circuit well known in the pertinent art. The current associated with source 212 is a function of the amplitude and frequency of the signal "V" occurring at terminal pair 214. It is well known that in a conference circuit for voice transmission, only the portion of the input signals having frequencies in the voice pass band should be affected by the negative shunt impedance associated with the conference circuit. Further, the gain provided by the negative impedance should be substantially equal for all frequencies within the pass band. Therefore, a frequency compensation circuit 215 shown in FIG. 2 and described in greater detail with respect to FIG. 3, provides blocking of the low and high frequency portions of input signals prior to amplification and further provides frequency compensation in the pass band range.

During the stable three-subscriber conference call on the conference circuit 150, each of the input signals to OR gate 213 is in the "low" state, and the amplification circuitry is providing maximum gain for input signals originating from the ports P0 through P2. In this illustrative system, supervision of the communication lines connected to conference circuit 150 and associated with subscriber stations 101 and 103 is monitored at the junctor circuits 120 and 122, as previously described with respect to FIG. 1. The distant communication line associated with subscriber station 102 is monitored at trunk circuit 185, also shown in FIG. 1. As previously discussed, a circuit oscillation problem may exist when one of the subscribers associated with the conference call goes from an off-hook to an on-hook state. Such action immediately reduces the transmission losses from communication lines associated with the conference call. Since it is possible that an off-hook to on-hook transition at a subscriber station may not be an actual disconnect indication by the subscriber (for example, such a transition may indicate a signaling flash), it is not feasible to allow circuitry connected to the system control 140 shown in FIG. 1 to immediately disconnect the on-hook subscriber and reposition the remaining two subscribers to different network connections, thereby disconnecting the conference circuit 150 and making it available for subsequent conference calls. It is, therefore, necessary to determine that the on-hook state remains constant for a predetermined period of time before the aforementioned network reconfiguration can occur. However, during the predetermined period of time, it is necessary to decrease the gain of the conference circuit such that oscillation does not take place. Gain control in prior art conference circuits has required the use of substantial data path circuitry from a system control to the conference circuit and has further required supervision of the communication lines associated with a conference call to be monitored within the conference circuit itself. Such additional circuitry is costly and necessitates circuit complexity of the conference circuit and associated connections.

In accordance with the invention, oscillation is prevented by means of immediate gain control at the conference circuit. An off-hook to on-hook transition by any of subscriber stations 101 through 103 produces a reactive signal on the associated communication line. Level sensor circuit 220 is connected to tip and ring connectors 203 and 204, respectively, and detects the reactive signal occurring due to an off-hook to on-hook transition, and generates a timer starting signal which is also referred to as a timer initialization signal and applied to timer circuit 221 shown in FIG. 2. The timer circuit 221 is also connected to tip and ring connectors 203 and 204, respectively, and to symbolic OR gate 213. The timer circuit 221 is responsive to the timer initialization signal for generating a timer control signal which is applied as an input signal to OR gate 213. The timer control signal is a "high" state signal which will produce a corresponding "high" state signal at the output of OR gate 213. Gain control circuit 211 is responsive to the "high" state output signal of OR gate 213 to reduce the amplitude of signal "V" produced at terminal pair 214, thereby reducing the gain associated with conference circuit 150. The timer control signal remains in a "high" state for a predetermined period of time. Accordingly, the gain associated with the conference circuit 150 is reduced for a corresponding predetermined period of time. During this period of time, the system control 140, via signals received on the bus systems shown in FIG. 1, can perform timing operations to determine if the subscriber station has intended an actual disconnect. Further, control unit 160 can send command signals via input/output controller 165 and the bus systems to effect desired action within switching network 130. If system control 140 determines that the reactive signal is, for example, indicative of a momentary flash or is a false indication of a subscriber state transition, the conference call may remain in its present state. Maximum gain will be restored at the conclusion of the predetermined period of time. In an operating conference circuit designed in accordance with the invention, a predetermined period of time of 800 milliseconds was utilized and found to be sufficient to enable the system control 140 and associated circuitry to perform necessary actions relating to the detection of subscriber station transitions. During the 800 millisecond interval, a reduction in signal strength may be noticed by talking subscribers. However, the reduction during this short time interval does not significantly affect the quality of conversation.

If the system control 140 determines, via signals received on the bus systems shown in FIG. 1, that a subscriber station intends an actual on-hook, network connections of the remaining two-subscriber call will conventionally be reconfigured and conference circuit 150 will be disconnected and made available for subsequent conference calls. However, the existing two-subscriber connection may remain connected through conference circuit 150 if other network paths are not available. It is then necessary to reduce the gain of the conference circuit 150 for the duration of the two-subscriber call.

To accomplish this necessary reduction in gain, supervisory elements S1 and S2, connected to OR gate 213 and to ports P1 and P2, respectively, as shown in FIG. 2, allow for control of the gain of the conference circuit independent of the level sensor and timer circuits 220 and 221, respectively. It should be emphasized that supervisory elements S1 and S2 do not monitor the communication lines associated with the subscriber stations of the conference call. The elements merely monitor the states of the junctor circuits associated with the noncontrolling ports P1 and P2 of the conference circuit 150. By way of example, if the conference circuit 150 is being utilized in a threeway talking connection and the subscriber station 103 associated with port P2 goes to an on-hook state, the level sensor circuit 220 and timer circuit 221 will detect a reactive signal on the tip and ring connectors 203 and 204 and generate the timer control signal applied to gate 213, thereby generating a signal to gain control circuit 211 which reduces the gain of the conference circuit for a predetermined period of time. If the system control 140 of the telephone switching system 100, as shown in FIG. 1, determines that subscriber station 103 is to be disconnected from the conference call, network connections between subscriber stations 101 and 102 may be reconfigured and conference circuit 150 is disconnected. However, it is possible to utilize the previously established connections for the remaining two-subscriber call by switching the junctor circuit 121 connected to port P1 into a state which activates supervisory element S1. Supervisory element S1 then generates a "high" state signal which is applied to gate 213 as shown in FIG. 2. The resultant output signal of gate 213 is applied to gain control circuit 211 thereby sufficiently reducing the gain of conference circuit 150 to prohibit circuit oscillation. Supervisory element S2 is identical in function to element S1 when a subscriber station remains connected to port P2.

A detailed illustrative embodiment of a conference circuit in accordance with the invention is shown in FIG. 3. FIG. 3 is a discrete circuit diagram of the conference circuit 150 depicted in FIG. 2. The amplifier and frequency compensation circuitry comprise transistor Q1, capacitors C1 and C2, and resistors R1 through R3. When an input signal is applied across the tip and ring terminals of any of ports P0 through P2, the time variant portion of the input signal is applied to the base of transistor Q1. Capacitor C1 performs blocking of direct current input signals. The resultant signal at the collector of Q1 is an inverted amplified signal. For input signals of voice band frequencies, the gain provided by the amplifier circuit is approximately equal to the resistance ratio of R2 to R3. Capacitor C2, connected in parallel to resistor R2 as shown in FIG. 3, provides for frequency compensation of signals at high frequencies in relation to signals in the voice band range. This frequency compensation assures that no oscillation occurs due to noise signals at high frequencies. Similarly, capacitor C1, which provides for DC blocking, also provides for frequency compensation at frequencies which are lower than the voice band range. Again, this frequency compensation is necessary to assure that noise frequencies in the low range do not provide oscillation within the conference circuit.

Transistors Q2 and Q3 with resistors R5 and R6 comprise a voltage controlled current source. As a signal is applied to the base input of transistor Q1, and an amplified signal appears at the collector of transistor Q1, it is applied to the base of transistor Q2. A signal substantially equal to that applied to the base of transistor Q2 is further applied to the base of transistor Q3. As the input signal at the base of transistor Q1 increases, the signals amplified by transistors Q2 and Q3 become more negative which decreases the associated emitter currents. This reduction of current in conjunction with an increasing input signal amplitude and the inversion of the input signal produces an effective negative shunt impedance in conference circuit 150. The current signals provided by the aforementioned voltage controlled current source are those flowing through resistors R5 and R6. As will be described in subsequent paragraphs, a method of reducing the gain of the amplification circuitry is to effectively connect a resistor in parallel with that of resistor R2. It should be remembered that the gain is provided by the ratio of resistor R2 to resistor R3.

The next portion of the conference circuit 150 to be described as shown in FIG. 3, is the level sensor circuit. This circuit comprises transistor Q5 and resistors R8 through R10. During normal operation of the conference circuit with three subscriber station connections, transistor Q5 is in the "OFF" state, i.e., no current is flowing through the collector of Q5. Resistors R9 and R10 comprise a bias string which effectively sets the reference signal level at which a signal applied to the base of transistor Q5 will be sufficient to "trip" Q5 to the "ON" state. By deriving the reference signal in part from the actual time variant input signals to be measured, the reference signal level will be somewhat variable. However, the variance is compensated for by coupling the time variant signals to the emitter of Q1 via capacitor C1 and to the base of Q5 via R9 and R10. The values of the resistances can be chosen such that only a large time variant signal appearing on the tip and ring connectors 203 and 204, such as would appear with an off-hook to on-hook transition and its associated reactive signal, will provide a signal large enough to put Q5 in an "ON" state. When Q5 is "ON", current flows into the collector of Q5 through a connection from the collector of Q6 as shown in FIG. 3. R8 connects the emitter of Q5 to its base and provides lightning protection for this portion of the conference circuit.

Transistors Q6 and Q7 and their associated circuitry as shown in FIG. 3, comprise the timing circuit of the conference circuit 150. The collector of Q6 is connected to the base of transistor Q7.

When Q5 goes to an "ON" state in response to the aforementioned reactive signal, Q6 and Q7 go to "saturation" states. The voltage across R11, connected between the base and emitter of Q4 as shown in FIG. 3, is a small voltage with respect to that between tip and ring connectors 203 and 204. Similarly, the voltages across R12 and R13 as shown in FIG. 3, are also small relative to that between connectors 203 and 204. Thus, the initial current flowing through R15 immediately after Q6 and Q7 saturate, is approximately equal to the voltage between tip and ring connectors 203 and 204 divided by the resistance of R15. The current which charges capacitor C3 flows through R15 and decreases exponentially in accordance with a time constant determined by the values of R15 and C3. As the charging current decreases to a threshold value determined by the values of resistors R12 and R13, Q6 and Q7 will go to "OFF" states and the timing sequence will end. Resistor R14 provides a discharge path to reset capacitor C3 for subsequent timing sequences. R15 is designated the charging resistor and values for R12 through R15 and C3 may be chosen to effect the desired timing and reset sequences.

Gain control of conference circuit 150 is provided by transistor Q4 and resistor R7 as shown in FIG. 3. By way of example, when C3 begins to charge during a timing sequence, Q4 goes to "saturation" state. With Q4 saturated, resistor R7 is effectively connected in parallel with resistor R2 and the gain of the previously described negative impedance amplifier is decreased. The values of R2 and R7 can be chosen such that the total impedance of conference circuit 150 approaches an ideal open circuit by effectively balancing the negative and positive impedances of the circuit. When the timing sequence is ended, i.e., Q6 and Q7 go to an "OFF" state, Q4 will go to an "OFF" state since no drive current will exist at the base of Q4. R7 will then be removed from the effective parallel combination with R2 and conference circuit 150 will return to a maximum gain state.

Supervisory circuit elements S1 and S2 shown in FIG. 3 provide further gain control as was described with respect to FIG. 2. In the illustrative embodiment shown in FIG. 3, S1 and S2 are opto-isolator circuits well known in the pertinent art. S1 and S2 are connected to ports P1 and P2, respectively, and are bridged across transistor Q4 as shown in FIG. 3. S1 and S2 provide a means for effectively shunting transistor Q4 in response to signals at ports P1 and P2, respectively, indicative of the states of associated junctor circuits as previously described with respect to FIG. 2. With S1 or S2 activated, the gain of conference circuit 150 is decreased since R7 is effectively connected in parallel with R2 as previously described with respect to the timing circuitry. Resistors R16 through R19 are desensitizing resistors which preclude alternating current signals at ports P1 and P2 from activating elements S1 and S2 in the absence of direct current signals at the ports. The ratios of R17 to R16 and R19 to R18 determine the magnitude of a signal required at either port P1 or port P2 to activate either of elements S1 or S2, respectively. R16 through R19 also minimize the nonlinear effects of the diodes of elements S1 and S2 on the talking connections and further protect the diodes of S1 and S2 by limiting the applied currents.

Capacitors C4A, C4B, C4C, and C4D shown in FIG. 3 provide blocking of direct current signals at ports P1 and P2. If blocking were not provided, the junctor circuits associated with ports P1 and P2 would be applying power to conference circuit 150 in addition to the power supplied through P0. Diodes CR1, CR2, CR3, and resistor R8 provide lightning protection for conference circuit 150 in the unlikely event that a voltage spike is not blocked by the associated junctor circuits. Supervisory elements S1 and S2 are also protected by utilizing the two-diode arrangements shown in FIG. 3 and well known in the art. Resistors R1 and R4 as shown in FIG. 3, comprise a bias circuit for signals applied to the base of Q1. As previously described, the ratio of R2 to R3 determines the effective gain of amplifier Q1.

It should be noted that though the illustrative embodiment described herein provides a conference connection of three subscriber stations, the invention is not limited to such a connection. A conference circuit in accordance with the invention may comprise more than three ports and provide gain control which allows a plurality of effective impedance levels.

It is to be understood that the above-described arrangement is merely an illustrative application of the principles of the invention; numerous other arrangements may be devised by those skilled in the art without departing from the spirit and scope of the invention.

I claim:

1. In a telecommunication system comprising a plurality of subscriber stations (101, 102, 103) having on-hook and off-hook states, and communication lines (104, 105, 106) connected to said subscriber stations (101, 102, 103), a conference circuit (150) comprising:
a plurality of ports (P0, P1, P2) connectable to said communication lines (104, 105, 106), and amplifying means (210 through 213) connected to said ports (P0, P1, P2) for amplifying input signals applied to said ports (P0, P1, P2);
CHARACTERIZED IN THAT
said conference circuit (150) further comprises:

sensing means (220, 221) connected to said amplifying means (210 through 213) and to said ports (P0, P1, P2) for sensing state transition signals indicative of subscriber station state transitions generated by said subscriber stations (101, 102, 103) on said communication lines (104, 105, 106) connected to said conference circuit (150) and for applying a corresponding control signal to said amplifying means (210 through 213); and said amplifying means (210 through 213) is directly responsive to said control signal for adjusting the magnitude of amplification of said input signals.

2. A conference circuit (150) in a telecommunication system in accordance with claim 1
CHARACTERIZED IN THAT
said sensing means (220, 221) comprises:
level sensing means (220) connected to said ports (P0, P1, P2) for sensing said state transition signals indicative of subscriber station state transitions generated by said subscriber stations (101, 102, 103) on said communication lines (104, 105, 106) and for generating a timer starting signal; and
timing means (221) connected to said ports (P0, P1, P2), said level sensing means (220), and said amplifying means (210 through 213), and responsive to said timer starting signal for applying said control signal to said amplifying means (210 through 213) for a predetermined period of time.

3. A conference circuit (150) in a telecommunication system in accordance with claim 1 wherein said system further comprises means for generating conference circuit inhibit signals when one of said subscriber stations (101, 102, 103) connected to said conference circuit (150) is in an on-hook state,
CHARACTERIZED IN THAT
said amplifying means (210 through 213) is responsive to said control signal and said inhibit signals for adjusting the magnitude of amplification of said input signals.

4. A conference circuit (150) in a telecommunication system in accordance with claim 1 wherein said plurality of ports (P0, P1, P2) comprises a plurality of noncontrolling ports (P1, P2);
CHARACTERIZED IN THAT
said conference circuit (150) further comprises monitoring means (S1, S2) connected to said plurality of noncontrolling ports (P1, P2) and to said amplifying means (210 through 213) for monitoring signals at said noncontrolling ports (P1, P2) indicative of a subscriber station state transition and for applying amplifier inhibit signals to said amplifying means (210 through 213), and said amplifying means is responsive to said inhibit signals and to said control signal for adjusting the magnitude of amplification of said input signals.

5. A conference circuit (150) in a telecommunication system in accordance with claim 1 wherein said telecommunication system further comprises multistate junctor circuits (120, 121, 122) interconnecting said communication lines (104, 105, 106) and said ports (P0, P1, P2), and said plurality of ports (P0, P1, P2) comprises a controlling port (P0) and first and second noncontrolling ports (P1, P2);
CHARACTERIZED IN THAT
said conference circuit (150) further comprises first and second supervisory elements (S1, S2), connected to said first and said second noncontrolling ports (P1, P2), respectively, and each connected to said amplifying means (210 through 213) and responsive to changes of state of said junctor circuits (121, 122) connected to said first and second noncontrolling ports (P1, P2), respectively, for applying first and second amplifier inhibit signals to said amplifying means (210 through 213); and said amplifying means (210 through 213) is responsive to said first and second amplifier inhibit signals and to said control signal generated by said sensing means (220, 221) for adjusting the magnitude of amplification of said input signals in the presence of any one of said amplifier inhibit and control signals.

6. A conference circuit (150) in a telecommunication system in accordance with claim 1
CHARACTERIZED IN THAT
said conference circuit (150) further comprises frequency compensation means (215) connected to said ports (P0, P1, P2) and to said amplifying means (210 through 213) and responsive to input signals applied to said ports (P0, P1, P2) for blocking portions of said input signals having frequencies less than a predetermined lower frequency and portions of said input signals having frequencies greater than a predetermined upper frequency from being applied to said amplifying means (210 through 213).

7. A conference circuit (150) in a telecommunication system in accordance with claim 2
CHARACTERIZED IN THAT
said amplifying means (210 through 213) comprises:
an inverting amplifier (210) connected to said ports (P0, P1, P2) and responsive to input signals applied to said ports (P0, P1, P2) for generating inverted amplified input signals;
a gain control circuit (211, 213) connected to said ports (P0, P1, P2), said inverting amplifier (210), and said timing means (221) and responsive to said control signal for adjusting the amplification of said inverted amplified input signals for said predetermined period of time; and
a voltage controlled current source (212) connected to said ports (P0, P1, P2) for generating a current which is a function of the amplitude and frequency of said input signals.

8. A conference circuit (150) in a telecommunication system in accordance with claim 1 wherein said communication system further comprises multistate junctor circuits (120, 121, 122) interconnecting said communication lines (104, 105, 106), and said plurality of ports (P0, P1, P2) comprises a controlling port (P0) and a plurality of noncontrolling ports (P1, P2);
CHARACTERIZED IN THAT
said conference circuit (150) further comprises a plurality of capacitors (C4A, C4B, C4C, C4D) connected to said noncontrolling ports (P1, P2) for blocking direct current signals at said noncontrolling ports (P1, P2) and wherein power is applied to said conference circuit (150) through said controlling port (P0).

9. A conference circuit (150) in a telecommunication system in accordance with claim 5
CHARACTERIZED IN THAT
said first and second supervisory elements (S1, S2) comprise opto-isolator circuits responsive to said changes of state of said junctor circuits (121, 122) connected to said noncontrolling ports (P1, P2) for applying said amplifier inhibit signals to said amplifying means (210 through 213).

10. A conference circuit (150) in a telecommunication system in accordance with claim 2 wherein each of said ports (P0, P1, P2) comprises a tip terminal (T) and a ring terminal (R) and said conference circuit (150) further comprises a tip connector (203) interconnecting said tip terminals (T) and a ring connector (204) interconnecting said ring terminals (R);

CHARACTERIZED IN THAT said amplifying means (210 through 213) comprises an inverting amplifying transistor (Q1) connected to said tip and ring connectors (203, 204) for amplifying and inverting said input signals applied to said ports (P0, P1, P2);

said inverting amplifying transistor (Q1) having a base terminal connected to said tip connector (203) through a blocking means comprising a first capacitor (C1) for blocking input signals having frequencies below voice frequencies from being applied to said base terminal, a collector terminal connected to said tip connector (203) through means comprising a parallel combination of a first resistor (R2) and a second capacitor (C2) for preventing amplification of input signals having frequencies above voice frequencies applied to said ports (P0, P1, P2); and said amplifying means further comprises a second resistor (R3) connected to said ring connector (204) and to an emitter terminal of said inverting amplifying transistor (Q1) wherein the ratio of the resistance values of said first resistor (R2) and said second resistor (R3) is determinative of the amplification of said input signals having frequencies in the voice frequency range.

11. A conference circuit (150) in a telecommunication system in accordance with claim 10

CHARACTERIZED IN THAT said amplifying means (210 through 213) further comprises a voltage controlled current source (212) connected to said tip and ring connectors (203, 204) and comprising interconnected first and second current source transistors (Q2, Q3) for generating a current which is a function of the amplitude and frequency of said input signals, and wherein inverted amplified input signals generated by said inverting amplifying transistor (Q1) are applied to said voltage controlled current source (212) at a base terminal of said first current source transistor (Q2), and an emitter terminal of said second current source transistor (Q3) is connected to said base terminal of said inverting amplifying transistor (Q1) through a feedback resistor (R4).

12. A conference circuit (150) in a telecommunication system in accordance with claim 11

CHARACTERIZED IN THAT said level sensing means (220) comprises a bias string of resistors (R9, R10) connected to said tip and ring connectors (203, 204) and a sensing transistor (Q5) having a base terminal connected to said bias string (R9, R10), an emitter terminal connected to said emitter terminal of said inverting amplifying transistor (Q1), and a collector terminal connected to said timing means (221).

13. A conference circuit (150) in a telecommunication system in accordance with claim 12 wherein said plurality of ports (P0, P1, P2) comprises first and second noncontrolling ports (P1, P2);

CHARACTERIZED IN THAT said amplifying means (210 through 213) further comprises a gain control circuit (211, 213) for controlling the amplification of said inverting amplifying transistor (Q1) and comprising a gain control transistor (Q4) connected to said tip connector (203) and to said inverting amplifying transistor (Q1) through a shunt resistor (R7), and said conference circuit (150) further comprises first and second supervisory elements (S1, S2) connected to said first and second noncontrolling ports (P1, P2), respectively, and each connected to said tip connector (203) and said shunt resistor (R7);

said gain control transistor (Q4) is responsive to said control signal generated by said timing means (221) for establishing a path through said shunt resistor (R7) parallel to said first resistor (R2) thereby effectively reducing said ratio of resistance values of said first resistor (R2) and said second resistor (R3); and said first and second supervisory elements (S1, S2) are responsive to signals applied to said first and second noncontrolling ports (P1, P2), respectively, indicative of a subscriber station transition for establishing a path through said shunt resistor (R7) parallel to said first resistor (R2), thereby effectively reducing said ratio of resistance values of said first resistor (R2) and said second resistor (R3).

14. A conference circuit (150) in a telecommunication system in accordance with claim 13

CHARACTERIZED IN THAT said timing means (221) comprises:

a charging circuit (R14, R15, C3) comprising a third capacitor (C3); and a timing control circuit (Q6, Q7, R12, R13) connected to said charging circuit (R14, R15, C3), to said sensing transistor (Q5), and to said gain control transistor (Q4), and responsive to signals from said sensing transistor (Q5) for applying a charging current to said third capacitor (C3) and for initiating a signal to said gain control transistor (Q4), said timing control circuit (Q6, Q7, R12, R13) being further responsive to said charging current decreasing to a predetermined value for ending said signal to said gain control transistor (Q4).

15. In a telephone communication system having a plurality of subscriber stations (101, 102, 103) having on-hook and off-hook states, communication lines (104, 105, 106) connected to said subscriber stations (101, 102, 103) and a conference circuit (150) comprising a plurality of ports (P0, P1, P2), a method of controlling amplification of communication signals during a conference call comprising the step of connecting said plurality of communication lines (104, 105, 106) to said plurality of ports (P0, P1, P2);

CHARACTERIZED IN THAT said method further comprises the steps of:

A. Monitoring signals at said ports (P0, P1, P2) to detect signal level changes greater than a predetermined amount;

B. Adjusting a magnitude of amplification of said conference circuit (150) in response to detection of said level changes, and maintaining said adjusted magnitude of amplification for a predetermined period of time; and C. Detecting signals at said ports (P1, P2) indicative of subscriber station state transitions and adjusting said magnitude of amplification of said conference circuit (150) in response to said detected signals indicative of subscriber station state transitions, and maintaining said adjusted magnitude of amplification in response to said signals indicative of subscriber station state transitions for the duration of time that any of said communication lines (104, 105, 106) are connected to said conference circuit (150) in a talking connection.

* * * * *